(12) United States Patent
Hirakura

(10) Patent No.: US 11,402,721 B2
(45) Date of Patent: Aug. 2, 2022

(54) OPTICAL DEVICE, METHOD FOR CONTROLLING OPTICAL DEVICE, AND IMAGE DISPLAY APPARATUS

(71) Applicant: SEIKO EPSON CORPORATION, Tokyo (JP)

(72) Inventor: Takao Hirakura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 16/881,070

(22) Filed: May 22, 2020

(65) Prior Publication Data

US 2020/0371402 A1 Nov. 26, 2020

(30) Foreign Application Priority Data

May 23, 2019 (JP) .............................. JP2019-096739

(51) Int. Cl.
*G02F 1/29* (2006.01)
*G02B 26/10* (2006.01)

(52) U.S. Cl.
CPC ................ *G02F 1/29* (2013.01); *G02B 26/10* (2013.01)

(58) Field of Classification Search
CPC .......... G02F 1/29; G02F 1/292; G02F 1/0147; G02F 1/291; G02F 2203/15; G02F 2203/24; G02F 1/09; G02F 1/294; G02F 2202/30; G02F 1/0151; G02F 1/13; G02F 1/21; G02F 1/213; G02F 1/353; G02F 2201/305; G02F 2203/12; G02F 1/0018; G02F 1/0036; G02F 1/0045; G02F 1/011; G02F 1/015; G02F 1/01716; G02F 1/01791; G02F 1/0305; G02F 1/0316; G02F 1/061; G02F 1/094; G02F 1/095; G02F 1/1303; G02F 1/1313; G02F 1/1323; G02F 1/133342; G02F 1/133371; G02F 1/133521; G02F 1/133553; G02F 1/133606; G02F 1/133607; G02F 1/133622; G02F 1/133757; G02F 1/1347;
(Continued)

(56) References Cited

U.S. PATENT DOCUMENTS 6,065,231 A 5/2000 Suzuki et al.
7,509,946 B2 3/2009 Cooke et al.
(Continued)

FOREIGN PATENT DOCUMENTS

JP 2002-250970 A 9/2002
JP 3958819 B2 8/2007
(Continued)

*Primary Examiner* — Collin X Beatty
*Assistant Examiner* — Grant A Gagnon
(74) *Attorney, Agent, or Firm* — Dority & Manning, P.A.

(57) ABSTRACT

A method for controlling an optical device including a movable section including an optical section that refracts incident video image light and outputs the refracted video image light and a holding section that supports the optical section, and an actuator that causes the movable section to swing, the method including applying a drive signal to the actuator to cause the movable section to swing. The drive signal is a wave having a trapezoidal waveform, and the trapezoidal wave has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied.

8 Claims, 10 Drawing Sheets

(58) Field of Classification Search
CPC .... G02F 1/13471; G02F 1/1392; G02F 1/212; G02F 1/218; G02F 1/2257; G02F 1/23; G02F 1/293; G02F 1/295; G02F 1/2955; G02F 1/31; G02F 1/315; G02F 1/33; G02F 1/3507; G02F 1/3515; G02F 1/3517; G02F 1/354; G02F 1/37; G02F 1/3775; G02F 1/39; G02F 2201/16; G02F 2201/44; G02F 2201/58; G02F 2202/02; G02F 2202/025; G02F 2202/12; G02F 2202/13; G02F 2202/32; G02F 2203/13; G02F 2203/22; G02F 2203/56; G02F 2203/60; G02B 26/0816; G02B 27/48; G02B 30/27; G02B 26/0833; G02B 1/005; G02B 26/08; G02B 26/0825; G02B 30/33; G02B 5/008; G02B 6/1226; G02B 2006/1213; G02B 21/0076; G02B 26/02; G02B 26/06; G02B 26/0808; G02B 26/123; G02B 27/0093; G02B 27/42; G02B 3/14; G02B 6/29313; G02B 6/356; G02B 13/22; G02B 17/004; G02B 1/007; G02B 2027/0118; G02B 2027/0187; G02B 21/0032; G02B 26/004; G02B 26/0841; G02B 26/101; G02B 26/125; G02B 27/0101; G02B 27/017; G02B 27/0172; G02B 27/1006; G02B 27/1086; G02B 3/0006; G02B 6/0038; G02B 6/29311; G02B 6/3512; G02B 7/008; G02B 13/0005; G02B 13/16; G02B 15/00; G02B 15/06; G02B 19/0014; G02B 19/0023; G02B 19/0042; G02B 1/00; G02B 1/002; G02B 2027/0134; G02B 2027/0138; G02B 2027/0154; G02B 2027/0174; G02B 2027/0178; G02B 1/0016; G02B 21/082; G02B 21/365; G02B 2207/101; G02B 2207/114; G02B 2207/123; G02B 26/00; G02B 26/001; G02B 26/005; G02B 26/007; G02B 26/0858; G02B 26/0866; G02B 26/0875; G02B 26/0883; G02B 26/10; G02B 26/106; G02B 27/0068; G02B 27/0087; G02B 27/0103; G02B 27/09; G02B 27/0938; G02B 27/0944; G02B 27/144; G02B 27/283; G02B 27/286; G02B 27/4261; G02B 27/4277; G02B 27/60; G02B 30/24; G02B 30/28; G02B 30/30; G02B 30/34; G02B 30/36; G02B 3/0031; G02B 3/0081; G02B 3/0087; G02B 5/001; G02B 5/02; G02B 5/0257; G02B 5/0278; G02B 5/045; G02B 5/06; G02B 5/08; G02B 5/0808; G02B 5/10; G02B 5/1828; G02B 5/201; G02B 5/284; G02B 5/30; G02B 5/32; G02B 6/00; G02B 6/002; G02B 6/0036; G02B 6/0048; G02B 6/0053; G02B 6/0056; G02B 6/0061; G02B 6/0068; G02B 6/02; G02B 6/02328; G02B 6/107; G02B 6/12021; G02B 6/12033; G02B 6/14; G02B 6/2713; G02B 6/29383; G02B 6/29385; G02B 6/3518; G02B 6/3542; G02B 6/3548; G02B 6/3556; G02B 6/3594; G02B 6/4296; G02B 7/181; G02B 7/1815

USPC ......................................................... 359/298
See application file for complete search history.

(56) References Cited

U.S. PATENT DOCUMENTS

| | | | |
|---|---|---|---|
| 9,664,980 | B2 | 5/2017 | Mizoguchi et al. |
| 2018/0047321 | A1 | 2/2018 | Hirakura |

FOREIGN PATENT DOCUMENTS

| | | |
|---|---|---|
| JP | 2008-051106 A | 3/2008 |
| JP | 2011-158589 A | 8/2011 |
| JP | 2016-071232 A | 5/2016 |
| JP | 6451187 B2 | 1/2019 |
| JP | 6515631 B2 | 5/2019 |

OPTICAL DEVICE, METHOD FOR CONTROLLING OPTICAL DEVICE, AND IMAGE DISPLAY APPARATUS

The present application is based on, and claims priority from JP Application Serial Number 2019-096739, filed May 23, 2019, the disclosure of which is hereby incorporated by reference herein in its entirety.

BACKGROUND

1. Technical Field

The present disclosure relates to an optical device, a method for controlling the optical device, and an image display apparatus including the optical device.

2. Related Art

To increase the resolution of a projected image as compared with the resolution of a light modulator, such as a liquid crystal panel, there has been a known technology for shifting the axis of video image light outputted from the light modulator.

For example, in the projection-type display apparatus described in JP-A-2011-158589, an optical path changing plate for shifting the optical axis of video image light by half the size of a pixel. In detail, the projection-type display apparatus is so driven and controlled that a state in which the optical path changing plate inclines by a predetermined angle toward the positive side and a state in which the optical path changing plate inclines by a predetermined angle toward the negative side are alternately iterated to increase the resolution of a projected image. In this process, to ensure the quality of the image, it is necessary to prolong the period for which the positive and negative predetermined angle inclination states are maintained, in other words, shorten the period required to switch the positive angle state to the negative angle state and vice versa. Further, the predetermined angle states need to be maintained as stably as possible. In JP-A-2011-158589, a drive signal for driving the optical path changing plate is skillfully designed. In detail, the polarity of current is changed from positive to negative and vice versa by using a sinusoidal wave as the the signal waveform of portions of the drive signal that are the portions where low potential is switched to high potential and vice versa (see FIG. 8). The predetermined angle states can each thus be maintained for a long period.

In the drive method described in JP-A-2011-158589, however, the sinusoidal wave portions cause the optical path changing plate to swing to the side opposite the intended side for an instant, resulting a problem of in blurred video image light. In view of the problem, the present inventors have proposed that a trapezoidal wave is used as the drive signal, as in the image display apparatus described in JP-A-2016-71232. The proposed method does not cause the change in the polarity, positive or negative, when low potential is switched to high potential and vice versa.

Using the drive signal shown in JP-A-2016-71232 allows generation of a less-blurred, higher-quality image than an image generated by the drive signal shown in JP-A-2011-158589, but there is still room for improvement. In detail, when a waveform Wo of a simple trapezoidal wave is used as the drive signal, the motion of the optical path changing plate substantially follows the trapezoidal wave, but the periods for which the linear portions corresponding to the lower and upper bases of the trapezoidal wave are maintained shorten, as indicated by a trajectory Uo, as shown in FIG. 12, resulting in a problem of degradation in image quality. Further, undershoots and overshoots occur at the linear portions of the lower and upper bases of the trajectory Uo, resulting the problem of degradation in image quality. FIG. 12 will be described later in detail.

SUMMARY

A method for controlling an optical device according to the present application is a method for controlling an optical device including a movable section including an optical section that refracts incident video image light in accordance with an angle of incidence of the video image light and outputs the refracted video image light and a holding section that supports the optical section, and an actuator that causes the movable section to swing, the method including applying a drive signal to the actuator to cause the movable section to swing. The drive signal is a wave having a trapezoidal waveform, and the trapezoidal wave has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied.

In the method for controlling an optical device described above, the third voltage may be higher than an intermediate value between the first voltage and the second voltage.

In the method for controlling an optical device described above, each leg section of the trapezoidal wave may have a first leg section that connects the first flat section to the third flat section, the third flat section, and a second leg section that connects the third flat section to the second flat section, and the first and second leg sections may each be a straight line.

In the method for controlling an optical device described above, inclination of the second leg section with respect to the first flat section may be smaller than inclination of the first leg section with respect to the first flat section.

In the method for controlling an optical device described above, each leg section of the trapezoidal wave may have a first leg section that connects the first flat section to the third flat section, the third flat section formed of a straight line, and a second leg section that connects the third flat section to the second flat section, and the first and second leg sections may each include a curve.

In the method for controlling an optical device described above, the first and second leg sections may each be a quarter-cycle sinusoidal wave.

An optical device according to the present application includes a movable section including an optical section that refracts incident video image light in accordance with an angle of incidence of the video image light and outputs the refracted video image light and a holding section that supports the optical section, an actuator that causes the movable section to swing, and a drive circuit that applies a drive signal to the actuator. The drive signal is a wave having a trapezoidal waveform, and the trapezoidal wave has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied.

An image display apparatus according to the present application includes the optical device described above and a projection optical system that enlarges and projects the video image light outputted from the optical device.

DESCRIPTION OF EXEMPLARY EMBODIMENTS

Embodiments of the present disclosure will be described below with reference to the drawings. In the following drawings, each layer and each portion are so drawn at scales different from actual scales as to be large enough to be recognizable on the drawings.

Embodiment 1

1) Overview of Projector

Figure 1:
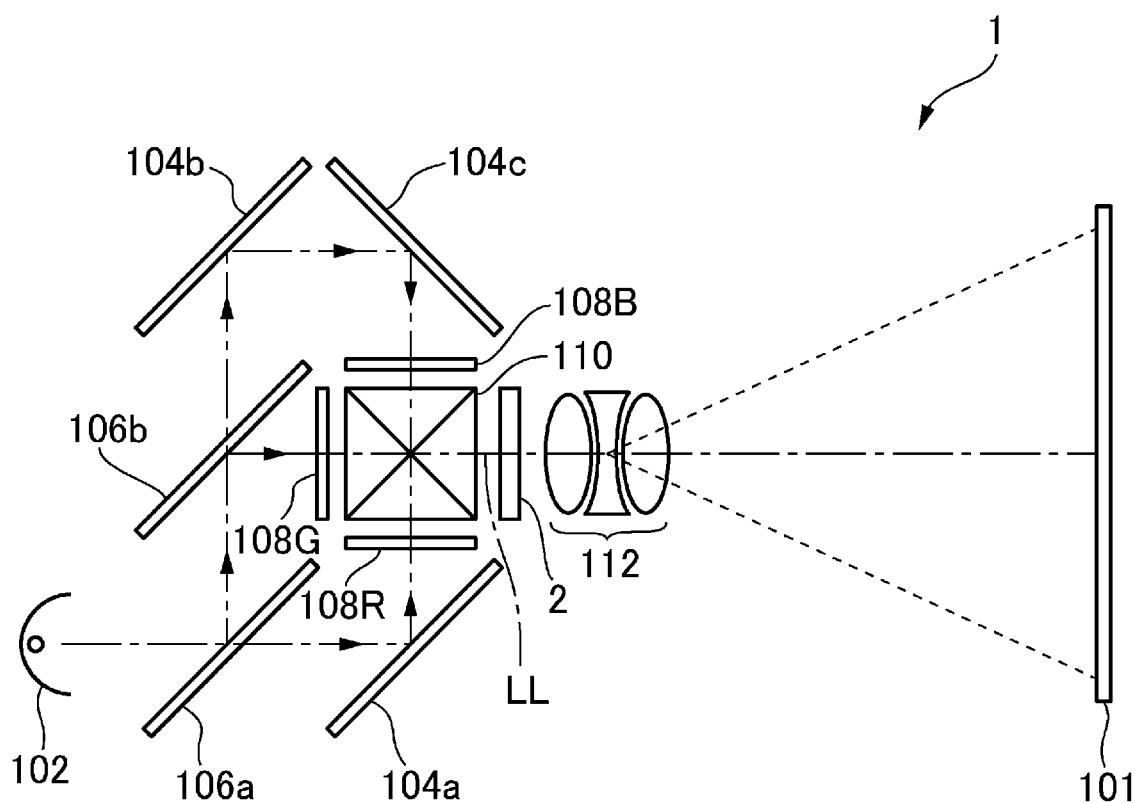
FIG. 1 is a schematic configuration diagram of a projector according to Embodiment 1.

FIG. 1 is a descriptive diagram showing the optical configuration of a projector according to the present embodiment. The configuration of a projector 1 according to the present embodiment will first be described.

The projector 1 as an image display apparatus is an LCD-based projector. The projector 1 is an apparatus that displays video images on a screen 101 based on an externally inputted video signal. The projector 1 is formed of a light source 102, mirrors 104a, 104b, and 104c, dichroic mirrors 106a and 106b, liquid crystal display elements 108R, 108G, and 108B, a dichroic prism 110, an optical path shifting device 2, a projection optical system 112, and other components.

Examples of the light source 102 may include a halogen lamp, a mercury lamp, a light emitting diode (LED), and a laser light source. The light source 102 is a light source that outputs white light. The light outputted from the light source 102 is separated by the dichroic mirror 106a, for example, into red light (R) and other light. The red light is reflected off the mirror 104a and then incident on the liquid crystal display element 108R. The other light is further separated by the dichroic mirror 106b into green light (G) and blue light (B). The green light is reflected off the dichroic mirror 106b and then incident on the liquid crystal display element 108G. The blue light passes through the dichroic mirror 106b, is then reflected off the mirrors 104b and 104c, and is then incident on the liquid crystal display element 108B.

The liquid crystal display elements 108R, 108G, and 108B are each used as a spatial light modulator. The liquid crystal display elements 108R, 108G, and 108B are transmissive spatial light modulators corresponding to the three primary colors of light, R, G, and B, and each include pixels arranged in a matrix formed, for example, of 1080 vertically arranged rows and 1920 horizontally arranged columns. The pixels each adjust the amount of light that passes through the pixel with respect to the amount of light incident on the pixel, and the liquid crystal display elements 108R, 108G, and 108B cooperatively control the distribution of the amounts of light over the entire pixels. The light fluxes spatially modulated by the thus configured liquid crystal display elements 108R, 108G, and 108B are combined with one another by the dichroic prism 110, and the combined light is outputted as full-color video image light LL from the dichroic prism 110. The outputted video image light LL travels via the optical path shifting device 2, is enlarged by the projection optical system 112, and is projected by the projection optical system 112 onto the screen 101.

The optical path shifting device 2 as an optical device is disposed between the dichroic prism 110 and the projection optical system 112. In the projector 1, the optical path shifting device 2 shifts the optical path of the video image light LL in accordance with the angle of incidence thereof, and an image having resolution higher than the resolution of the liquid crystal display elements 108R, 108G, and 108B is projected on the screen 101. For example, when the liquid crystal display elements 108R, 108G, and 108B are each a full-high-vision display element, a 4K image is displayed. The optical path shift is also called "pixel shift."

2) Overview of Pixel Shift

Figure 2:
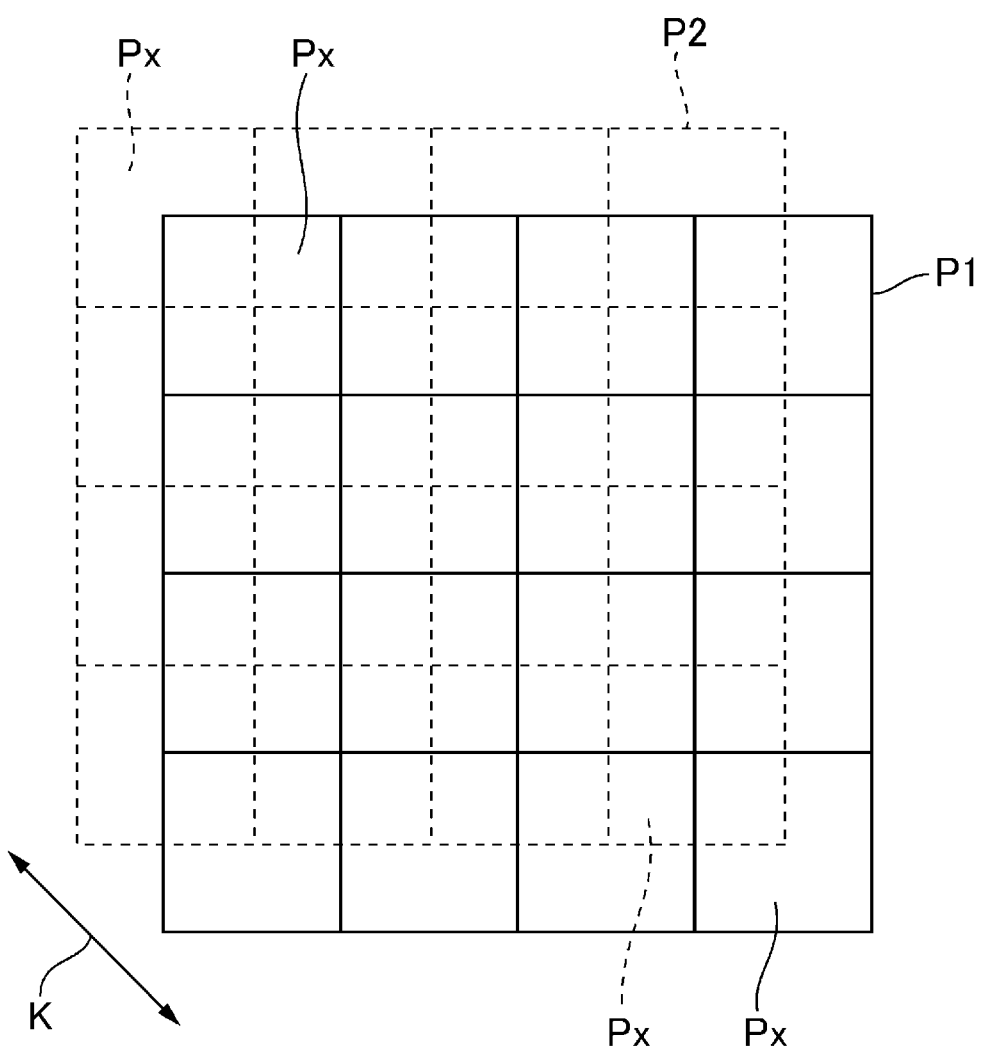
FIG. 2 shows a state in which an image display position is shifted by video image light pixel shift.

FIG. 2 shows a state in which an image display position is shifted by the video image light pixel shift.

The principle of the increase in resolution based on the pixel shift will be described with reference to FIG. 2.

The optical path shifting device 2 includes an optical path changing plate 30 (FIG. 5) as an optical section that transmits the video image light LL and changes the attitude of the optical path changing plate 30, which is a light-transmissive plate-shaped member, to shift the optical path of the video image light LL by using refraction thereof.

The projector 1 uses the optical path shift described above to alternately display an image in an image display position P1 where the optical path of the video image light LL is shifted to one side and an image display position P2 where the optical path of the video image light LL is shifted to the other side. The image display positions P1 and P2 are positions shifted from each other by a half pixel in a diagonal direction K of pixels Px on the screen 101. The half pixel refers to one half of each of the pixels Px. The pixel shift described above allows an increase in the apparent number of pixels, whereby the resolution of the image projected on the screen 101 can be increased. The amount of shift between the image display positions P1 and P2 is not limited to the half pixel and may, for example, be one-fourth or three-fourths of each of the pixels Px. Further, the pixels are not necessarily shifted in an oblique direction and may instead be shifted in the upward or downward direction or the rightward or leftward direction. Even when the pixels are shifted in the upward, downward, rightward, or leftward direction, the resolution of a projected image can be increased.

3) Circuit Block Configuration

Figure 3:
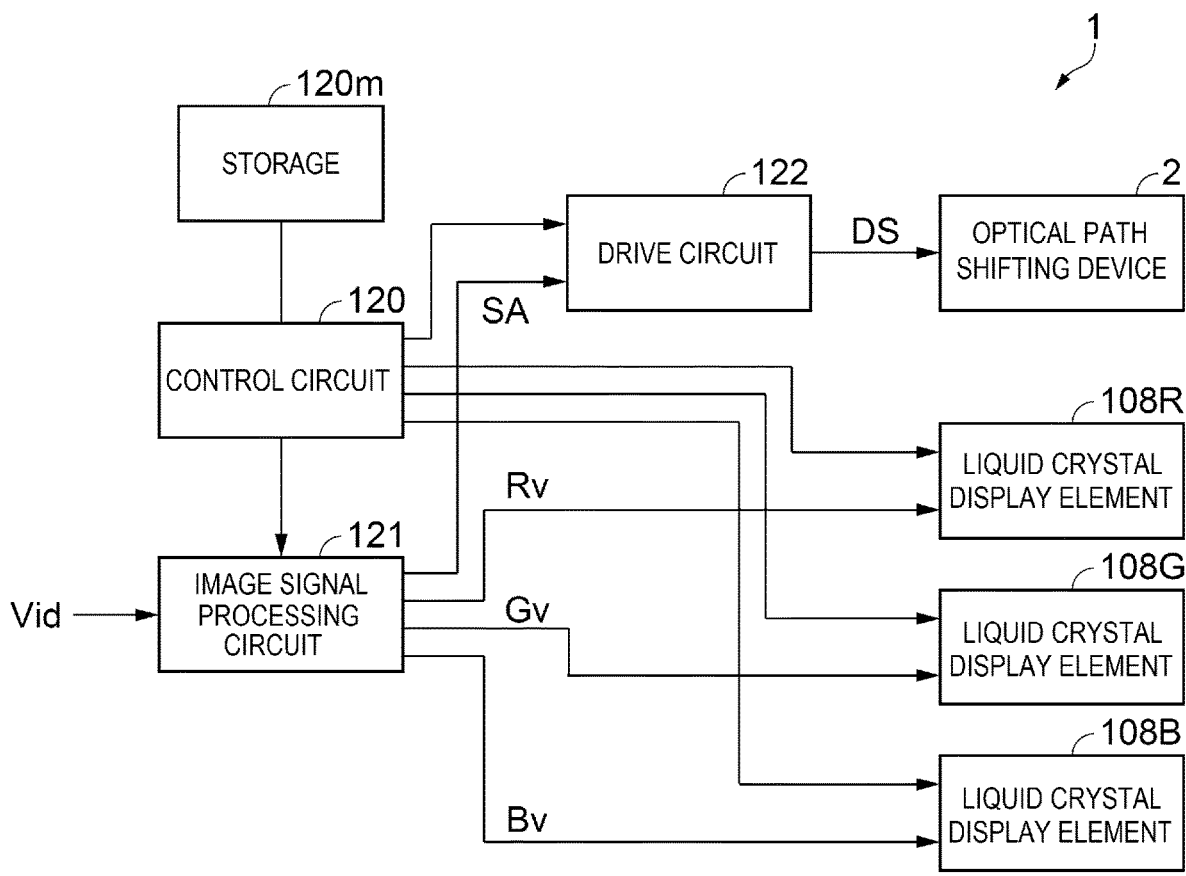
FIG. 3 is a circuit block diagram showing the electrical configuration of the projector.

FIG. 3 is a circuit block diagram showing the electrical configuration of the projector.

The projector 1 is formed of a control circuit 120, an image signal processing circuit 121, a drive circuit 122, and other components.

The control circuit 120 is a micro-controller unit (MCU) and controls the operation of the projector 1 including operation of writing data signals onto the liquid crystal display elements 108R, 108G, and 108B, optical path shift operation performed by the optical path shifting device 2, and data signal generation operation performed by the image signal processing circuit 121. The control circuit 120 accompanies a storage 120m formed, for example, of a nonvolatile memory, a ROM, and a RAM, and the storage 120m stores data on the drive waveform of a drive signal DS, a variety of programs for controlling the operation of the projector 1, and data associated with the programs.

The image signal processing circuit 121 separates an image signal Vid supplied from an external apparatus into R, G, and B signals corresponding to the three primary colors of light and converts the signals into data signals Rv, Gv, and By suitable for the operation of the liquid crystal display elements 108R, 108G, and 108B. The converted data signals Rv, Gv, and By are supplied to the liquid crystal display elements 108R, 108G, and 108B, respectively, and the liquid crystal display elements 108R, 108G, and 108B are so driven as to display images based on the data signals. The image signal processing circuit 121 may be formed of a digital signal processor (DSP), an application specific integrated circuit (ASIC), a programmable logic device (PLD), a field programmable gate array (FPGA), or any other circuit. The drive circuit 122 is a circuit that generates the drive signal DS for driving the optical path shifting device 2. The drive circuit 122 generates the drive signal DS based on a synchronization signal SA inputted from the image signal processing circuit 121 and supplies the drive signal DS to the optical path shifting device 2. The drive circuit 122 may be formed of a digital signal processor (DSP), an application specific integrated circuit (ASIC), a programmable logic device (PLD), a field programmable gate array (FPGA), or any other circuit.

Figure 4:
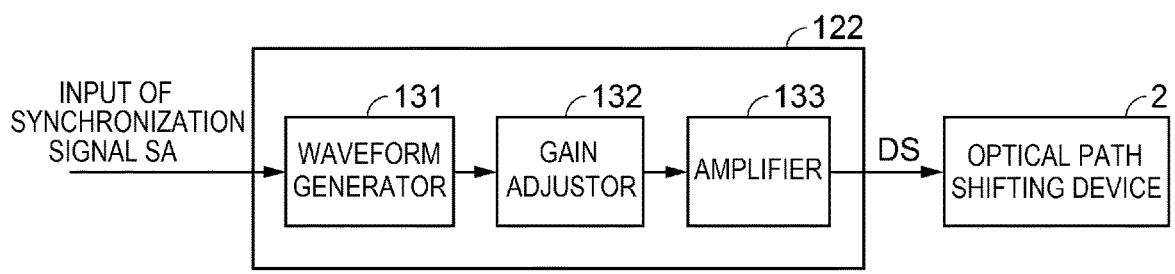
FIG. 4 is a circuit block diagram of a drive circuit.

FIG. 4 is a circuit block diagram of the drive circuit.

The drive circuit 122 includes a waveform generator 131, a gain adjuster 132, an amplifier 133, and other components, which generate the drive signal DS and adjust the waveform of the drive signal DS.

The waveform generator 131 includes a D/A converter and generates a trapezoidal drive signal based on the synchronization signal SA, which has a rectangular shape and synchronizes with an image. Specifically, using the synchronization signal SA as a trigger, the D/A converter converts the drive waveform data, which is digital data and is stored in the storage 120m, into an analog signal and outputs the analog signal. Using the D/A converter as described above to change the frequency of a conversion clock allows generation of a desired waveform, such as a trapezoidal wave having changed inclination of leg sections. In detail, changing the drive waveform data allows generation of a rectangular wave, a sinusoidal wave, a trapezoidal wave, and also the combination thereof.

The gain adjuster 132 includes a digital potentiometer, which changes the amplitude of the trapezoidal signal generated by the waveform generator 131. In a preferable example, the gain adjuster 132 includes an I²C bus as an interface and is configured to be capable of electrically changing resistance in accordance with a control signal from the control circuit 120.

The amplifier 133 includes an operational amplifier, which amplifies the trapezoidal signal having a gain adjusted by the gain adjuster 132, and supplies the amplified signal to an actuator in the optical path shifting device 2.

4) Configuration of Optical Path Shifting Device

Figure 5:
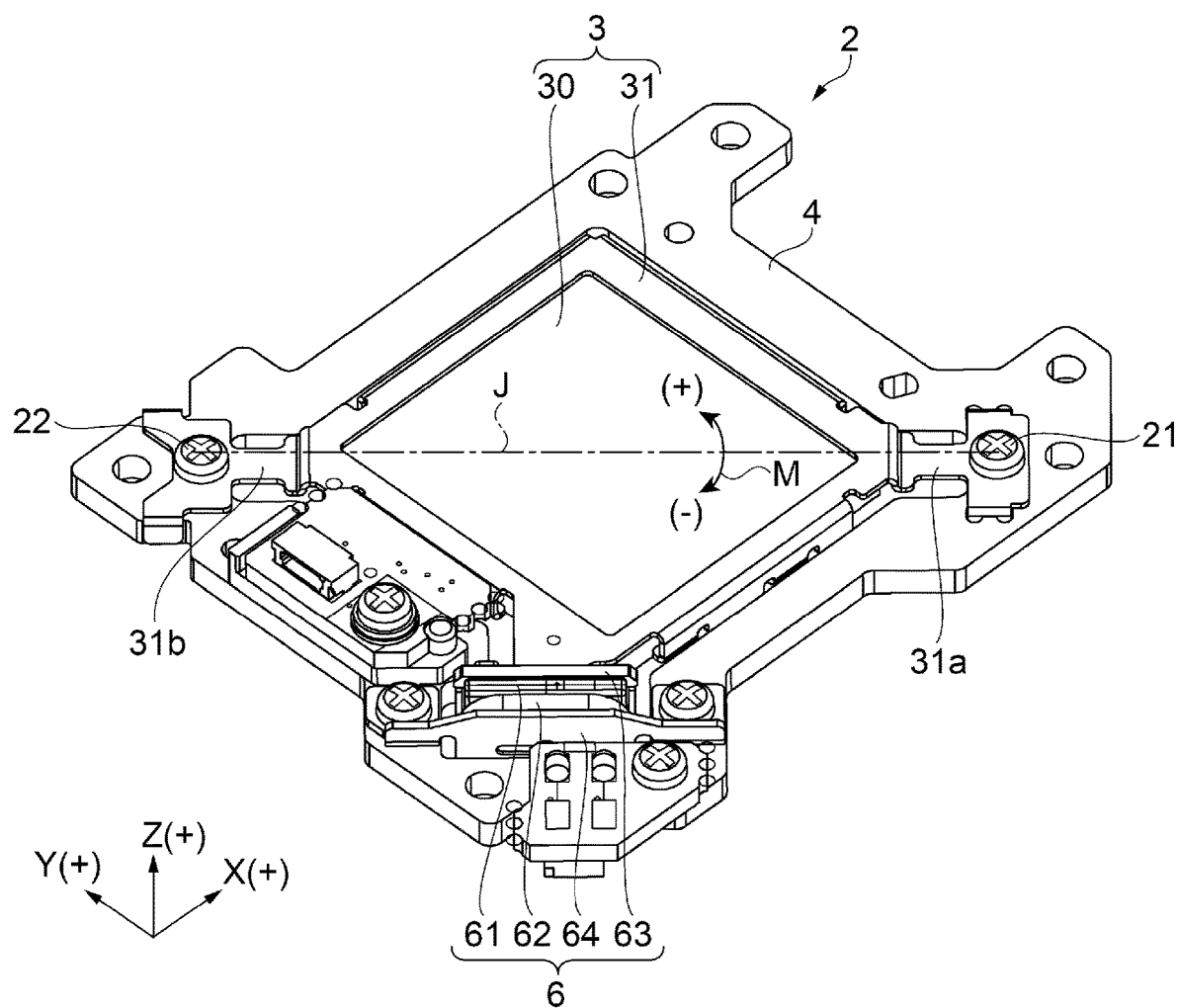
FIG. 5 is a perspective view of an optical path shifting device.

FIG. 5 is a perspective view of the optical path shifting device according to the present embodiment.

The configuration of the optical path shifting device 2 will next be described.

The optical path shifting device 2 is formed, for example, of a movable section 3, a support 4, and an actuator 6. In FIG. 5, the dichroic prism 110 (FIG. 1) is located on a side of the optical path shifting device 2 that is the side facing the positive side of the axis-Z direction, and the projection optical system 112 (FIG. 1) is located on a side of the optical path shifting device 2 that is the side facing the negative side of the axis-Z direction. In other words, the optical path shifting device 2 is so disposed that the video image light is incident on the optical path changing plate 30 of the optical path shifting device 2 from above the plane of view of FIG. 5 and exits toward the projection optical system 112 (FIG. 1), which is located on the rear side of the plane of view.

The movable section 3 is formed, for example, of the optical path changing plate 30, which serves as the optical section, and a holding frame 31, which holds the optical path changing plate 30. The optical path changing plate 30 is formed of a white sheet glass plate having a substantially square shape in a preferable example. Employing a white sheet glass plate that excels in strength allows an increase in rigidity of the movable section 3 as a whole, whereby deflection unevenness of the light deflected by the optical path changing plate 30 can be suppressed. The optical path changing plate 30 is not limited to a white sheet glass plate and may instead be made of any material having optical transparency and capable of refracting the video image light, such as borosilicate glass, quartz glass, and a variety of other glass materials. Still instead, the optical path changing plate 30 may be made of any of a variety of crystal materials, such as quartz and sapphire, or any of a variety of resin materials, such as a polycarbonate-based resin material and an acrylic resin material. The optical path changing plate 30 does not necessarily have a substantially square shape and may have any shape capable of refracting the video image light, such as an oblong shape, a rhombus shape, and an elliptical shape.

The holding frame 31 is a metal frame-shaped holding frame and supports the outer circumferential edge of the optical path changing plate 30 to accommodate the optical path changing plate 30 with the front and rear surfaces thereof exposed. In a preferable example, the holding frame 31 is made of stainless steel, and the optical path changing plate 30 is fixed to the holding frame 31 with an adhesive and integrated therewith. A first shaft 31a, which is a protruding portion in the form of a flange, is formed at one vertex portion of the holding frame 31. A screw hole is formed in the first shaft 31a, and the first shaft 31a is fixed to the support 4 with a screw 21. A second shaft 31b, which is a protruding portion similar to the first shaft 31a, is formed at a vertex portion of the holding frame 31 that is the vertex portion diagonal to the vertex portion at which first shaft 31a is formed. A screw hole is formed in the second shaft 31b, and the second shaft 31b is fixed to the support 4 with a screw 22. The holding frame 31 is not limited to a frame-shaped member that supports the entire outer circumferential edge of the optical path changing plate 30 and only needs to be a member that supports at least part of the optical path changing plate 30. The holding frame 31 corresponds to an example of the "holding section" in the present disclosure.

The support 4 is a support member made of a resin material and having a frame-like shape one-size larger than the holding frame 31. The movable section 3, the actuator 6, and other components are attached to the support 4. The movable section 3, specifically, a main body portion thereof primarily formed of the optical path changing plate 30 is accommodated in a central hole of the support 4 and attached to the support 4 via the first shaft 31a and the second shaft 31b, which protrude in the form of ear-shaped portions from diagonal portions of the movable section 3. The diagonal line that connects the first shaft 31a and the second shaft 31b to each other serves as an axis of swing motion J, and the movable section 3 can change its attitude in the pivotal direction indicated by the arrow M around the axis of swing motion J. In other words, since the movable section 3 having a substantially square shape is fixed to the support 4 along the axis of swing motion J, diagonal portions of the movable section 3 that are located on the diagonal line that intersects the axis of swing motion J are swingable around the axis of swing motion J. Therefore, the movable section 3 has a zero-inclination neutral attitude in the initial state, whereas the movable section 3 in the driven state undergoes iterative motion that causes the movable section 3 to alternately incline by a predetermined angle toward the positive side of the arrow M and a predetermined angle toward the negative side of the arrow M In the present specification, the iterative motion is also referred to as swing motion.

The actuator 6 is disposed at a diagonal portion of the support 4 that is the diagonal portion facing one of the swingable portions of the movable section 3. The actuator 6 is formed, for example, of a magnet 61, a magnet frame 63, a coil 62, and a coil frame 64. The magnet 61 and the magnet frame 63 are attached to the holding frame 31 of the movable section 3. The coil 62 and the coil frame 64 are attached to the support 4.

5) Configuration of Actuator

Figure 6:
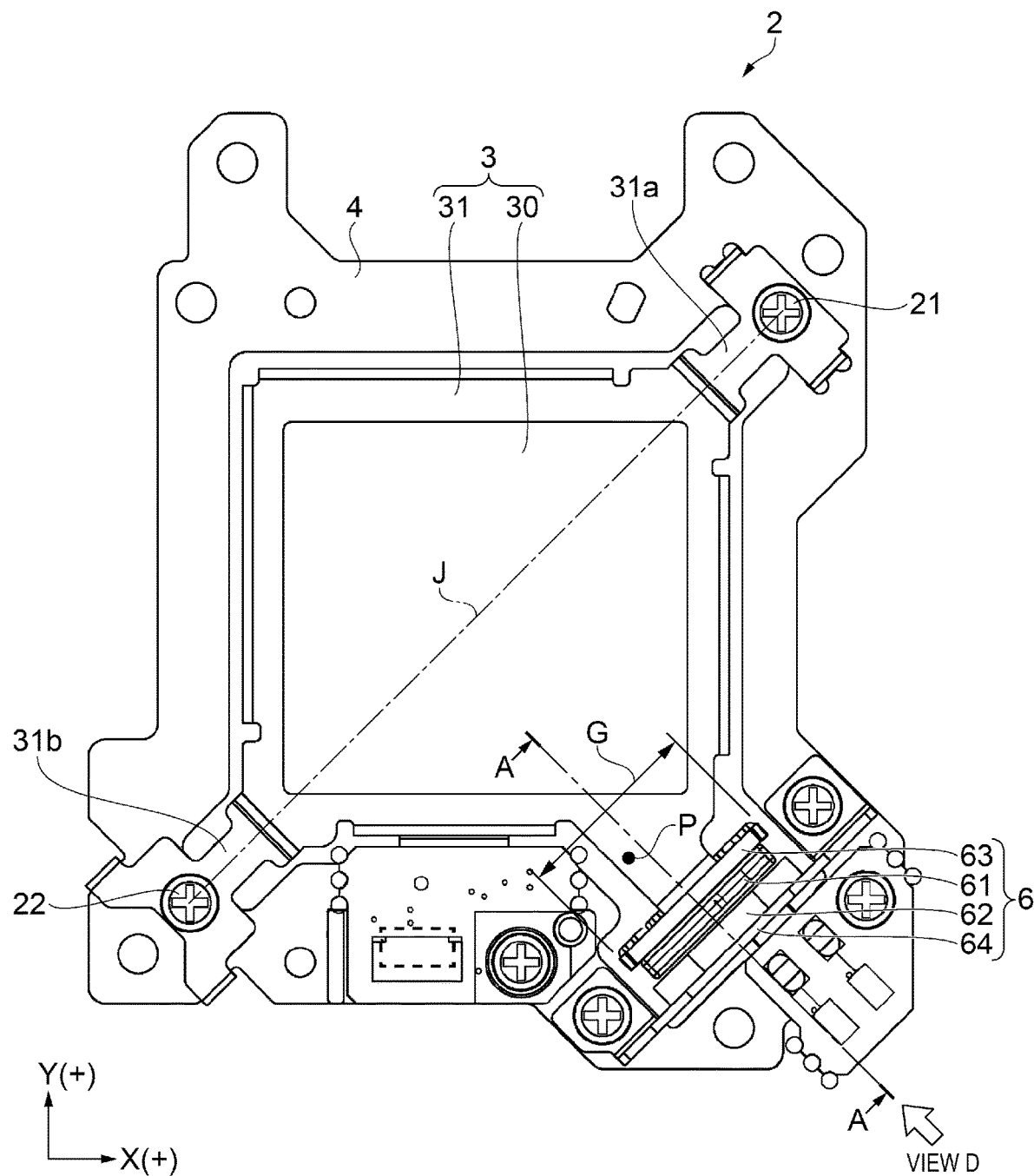
FIG. 6 is a plan view of the optical path shifting device.
Figure 7:
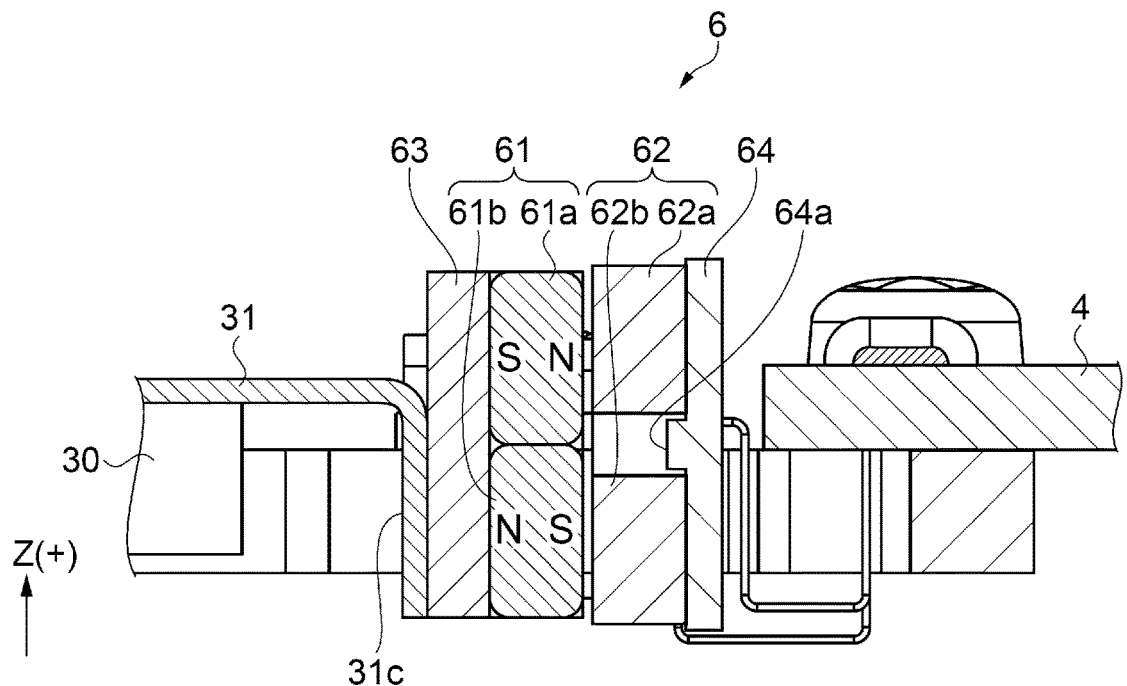
FIG. 7 is a cross-sectional view of the optical path shifting device taken along the line A-A in FIG. 6.

FIG. 6 is a plan view of the optical path shifting device. FIG. 7 is a cross-sectional view of the optical path shifting device taken along the line A-A in FIG. 6. The configuration of the actuator 6 will next be described with reference to FIGS. 6 and 7.

A vertex portion of the holding frame 31 that is the vertex portion facing the actuator 6 is folded to form an L-letter-shaped portion, which forms a flange 31c, to which the magnet frame 63 is attached, as shown in FIG. 7. The magnet frame 63 is fixed to the flange 31c. The magnet 61 is attached to the magnet frame 63. The magnet frame 63 is made of a metal, such as iron, and functions as a back yoke.

The magnet 61 is formed of a magnet 61a and a magnet 61b, which each have a rod-like shape and are stacked on each other along the axis Z. The magnet 61a is a rod-shaped magnet elongated in the depth direction in FIG. 7. The dimension G in FIG. 6 represents the length of the magnet 61a. The magnet 61a is so disposed that the north pole thereof faces the coil 62. The magnet 61b is also a rod-shaped magnet having the same length as that of the magnet 61a and is so disposed that the south pole thereof faces the coil 62. As a preferable example, the magnet 61 is a neodymium magnet. The magnet 61 is not limited to a neodymium magnet and may be any permanent magnet having intended magnetic force, such as a samarium-cobalt magnet, a ferrite magnet, or an alnico magnet.

The coil frame 64 and the coil 62 are attached in the presented order to the support 4. In detail, the coil 62 is attached to the coil frame 64, and the coil frame 64 is so fixed to the support 4 that the coil 62 faces the magnet 61 with a gap therebetween. The coil frame 64 is made of a metal, such as iron, and functions as a back yoke.

The view D in FIG. 6 represents a viewpoint from which the coil 62 is viewed along the axial direction of the windings of the coil. In the view D, the coil 62 is an air-core coil having a chamfered oblong shape. The chamfered oblong shape is also called a track shape. The longitudinal length of the coil 62 is substantially equal to the length of the magnet 61a.

A protrusion 64a, which guides the position of windings of the coil 62, is formed as part of the coil frame 64, and the coil 62 is so disposed as to surround the protrusion 64a, as shown in FIG. 7. A side of the protrusion 64a that is the side facing the magnet 61 forms a hollow portion. In the initial state in which the movable section 3 does not incline, the longitudinal side 62a of the coil 62 faces the magnet 61a and the longitudinal side 62b of the coil 62 faces the magnet 61b.

In the configuration described above, when the coil 62 is energized, current flows through the coil 62 to produce a magnetic field, which causes the coil 62 to repel or attract magnets 61a and 61b, so that a vertex portion of the movable section 3 that is the vertex portion facing the magnet 61 and the vertex portion diagonal to the aforementioned vertex portion undergo reciprocating motion substantially along the axis Z, resulting in swing motion of the entire movable section 3 around the axis of swing motion J.

The present embodiment employs what is called a "moving-magnet-type configuration" in which the magnet 61 is disposed in the movable section 3. Therefore, heat generated by the energized coil 62 in energization is not likely to be transferred to the movable section 3 or the optical path changing plate 30, whereby a change in the resonance frequency of the movable section 3, bending of the optical path changing plate 30, and other undesirable phenomena due to the heat can be suppressed.

6) Method for Controlling Operation of Driving Optical Path Shifting Device

Figure 12:
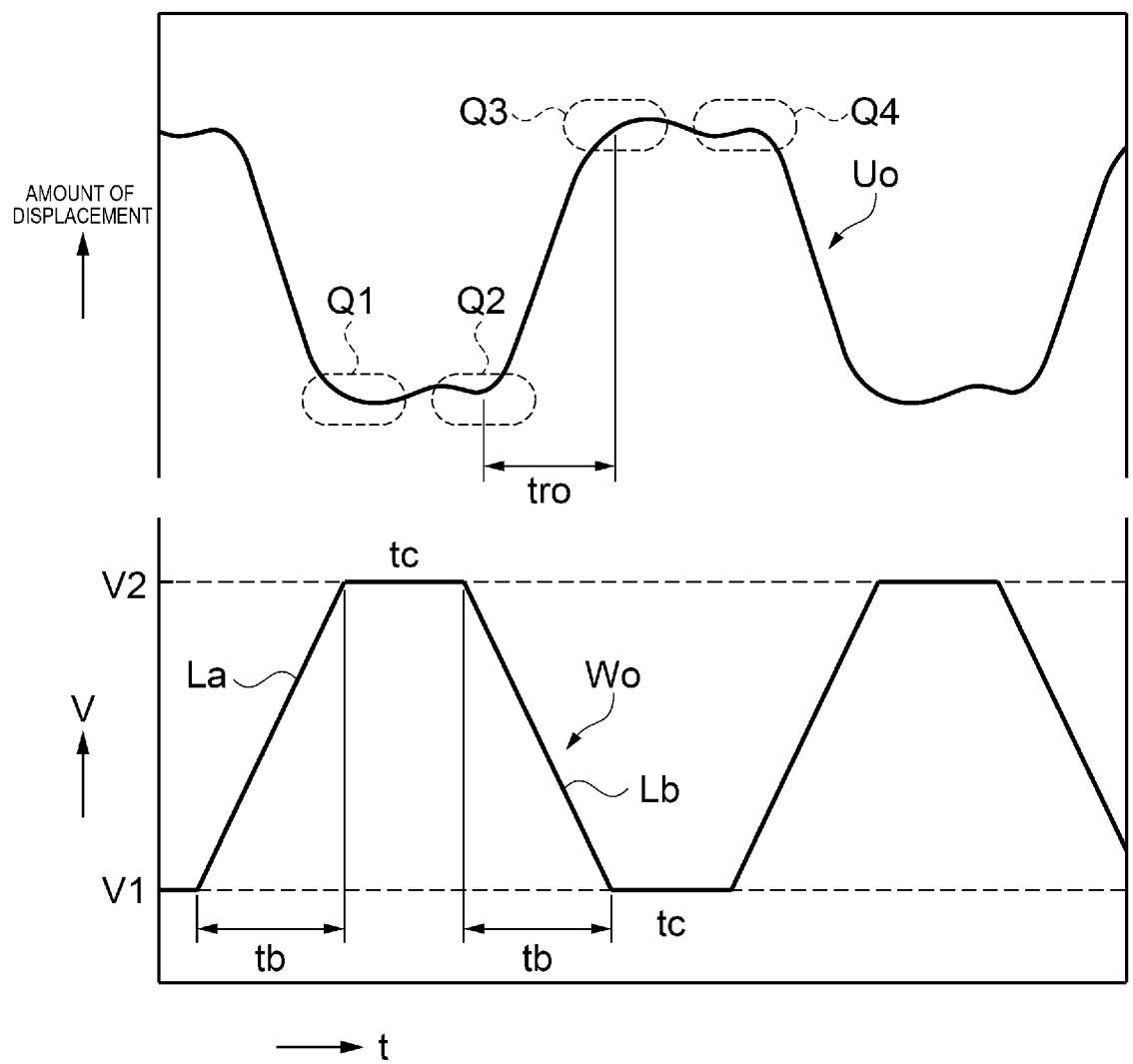
FIG. 12 shows a drive signal in related art and the resultant trajectory of the optical path shifting device.

FIG. 12 shows the drive signal in the related art and the resultant trajectory of the optical path shifting device.

The trajectory achieved when the optical path shifting device 2 is driven by using the drive signal in the related art will first be described with reference to FIG. 12.

The waveform Wo in FIG. 12 shows the waveform of the drive signal in the related art. The horizontal axis of FIG. represents time t, and the vertical axis of FIG. 12 represents voltage V. The waveform Wo is the waveform of a simple trapezoidal wave, and a rising leg section La is a single straight line. The rising leg section La rises from low-potential voltage V1 and changes to high-potential voltage V2 in a period tb. After the voltage V2 is maintained for a period tc, a falling leg section Lb formed of a single straight line returns to the low-potential voltage V1 in the period tb, and the voltage V1 is maintained for the period tc. The actions described above form one cycle and repeat to form the drive signal.

The trajectory Uo in FIG. 12 represents trajectory data on the amplitude of a measurement point P (FIG. 6) on the movable section 3 measured along the temporal axis with a laser displacement gauge when the waveform Wo is supplied as the drive signal to the optical path shifting device 2 to cause the movable section 3 to swing. The vertical axis of FIG. 12 showing the trajectory Uo represents the displacement width.

An ideal trajectory Uo is the trajectory of the reversed-phase trapezoidal wave having the waveform Wo and having the linear portions of the upper and lower bases maintained for a long period. It is desirable that the linear portions each correspond to a flat section and has no overshoot or other fluctuations but is stably flat. That is, when the movable section 3 iteratively inclines by the predetermined angle toward the positive side of the arrow M (FIG. 5) and by the predetermined angle toward the negative side of the arrow M, it is desirable that the movable section 3 does not rattle but smoothly moves and stably stops at opposite ends of the movement for a long period.

In contrast, the trajectory Uo of the movable section 3 has an undershoot Q1 at the bottom of a falling edge and has an overshoot Q2 in the vicinity of the end of the following flat section. Further, an overshoot Q3 occurs in an upper portion of the subsequent rising edge, and an undershoot Q4 occurs in the vicinity of the end of the following flat portion. Further, according to experimental data acquired by the present inventors, a rising period tro required for the trajectory Uo to rise from the lower base to the upper base is 2.12 ms.

7) Description of Drive Signal Waveform

Figure 8:
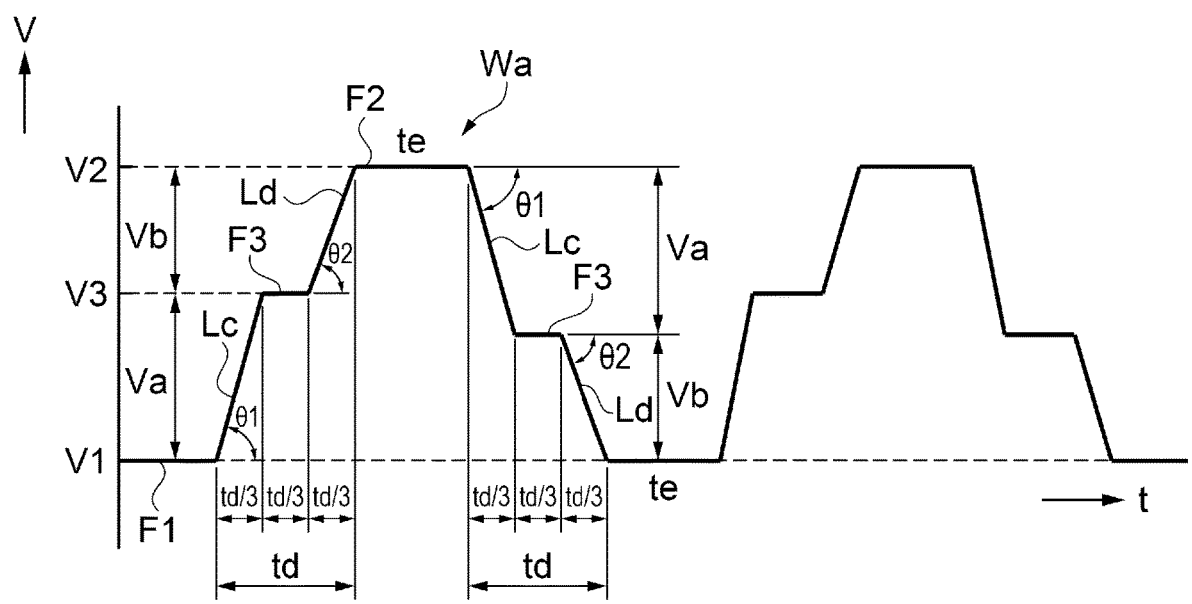
FIG. 8 is a waveform diagram of a drive signal.

FIG. 8 is a waveform diagram of the drive signal according to the present embodiment. A characteristic drive signal waveform in the present embodiment will be described in comparison with the waveform Wo in FIG. 12.

The waveform Wa in FIG. 8 is the waveform of the drive signal in the present embodiment. The waveform Wa is based on the waveform of a trapezoidal wave and has characteristic leg sections corresponding to the legs of the trapezoidal shape, that is, a flat section is provided in the middle of each of the leg sections. In the present specification, to distinguish the simple trapezoidal waveform from the waveform according to the embodiment, the waveform according to the embodiment is referred to as a trapezoidal wave. The legs of the trapezoidal wave are referred to as leg sections.

The rising waveform will first be described.

In the waveform Wa, the straight line along the potential of the voltage V1, which is first voltage, is a first flat section F1. The flat section F1 corresponds to the lower base of the trapezoidal shape. The straight line along the potential of the voltage V2, which is second voltage, is a second flat section F2. The flat section F2 corresponds to the upper base of the trapezoidal shape.

The rising leg section is formed of three straight lines and is provided with a flat section F3, which is located in the middle of the leg section and where the voltage does not change. In detail, the rising leg section is formed of a leg section Lc as a first leg section, the flat section F3, and a leg section Ld as a second leg section.

The leg section Lc rises from the low-potential flat section F1 at an angle θ1 and connects to the flat section F3. The flat section F3 corresponds to a third flat section and is a linear portion along the potential of voltage V3, which is third voltage. The voltage V3 is higher than the voltage V1 and lower than the voltage V2. The voltage V3 may be higher than the intermediate value between the voltage V1 and the voltage V2. The intermediate value used herein is, for example, the arithmetic mean of the voltage V1 and the voltage V2. For example, when the voltage V1 is 0 V and the voltage V2 is 3.3 V, the intermediate value is 1.65 V.

The leg section Ld rises from the flat section F3 at an angle θ2 and connects to the high-potential flat section F2. The flat sections F1 and F3 are parallel to each other.

The rising angle θ2 of the leg section Ld with respect to the flat section F1 is smaller than the rising angle θ1 of the leg section Lc. That is, the inclination of the leg section Ld is smaller than the inclination of the leg section Lc.

In a preferable example, the waveform Wa in the present embodiment and the waveform Wo in the related art have the same cycle and amplitude.

A first period for which the low-potential voltage V1 is applied and a second period for which the high-potential voltage V2 is applied are each a same-length period te.

A rising period td required for the waveform Wa to rise from the voltage V1 to the voltage V2 is divided into periods for the leg section Lc, the flat section F3, and the leg section Ld. In detail, the period td is equally divided into three portions, and the voltage is applied to for the period td/3 in each of the leg section Lc, the flat section F3, and the leg section Ld. A third period for which the voltage V3 is applied is therefore the period td/3. Instead, the voltage application periods in the leg sections Lc and Ld may be the same period, and the voltage application period in the flat section F3 may differ from those in the leg sections Lc and Ld.

The above description shows that a voltage change width Vb in the leg section Ld is smaller than a voltage change width Va in the leg section Lc.

The falling waveform will next be described.

After the flat section F2 is reached via the leg section Lc, the flat section F3, and the leg section Ld of the rising waveform, the voltage V2 is maintained for the period te, and the flat section F2 transitions to the falling waveform.

The falling waveform is the upside-down rising waveform. Reversing the waveform diagram upside down and replacing the voltage V2 with the voltage V1 and the voltage V1 with the voltage V2 allow the description of the falling waveform to be the same as the description of the rising waveform described above, and the flat section F3 in the form of a plateau is provided in the middle of each leg section.

After the falling waveform reaches the voltage V1, the voltage V1 is maintained for the period to in the flat section F1. One cycle of the waveform Wa is thus achieved.

8) Example

Figure 9:
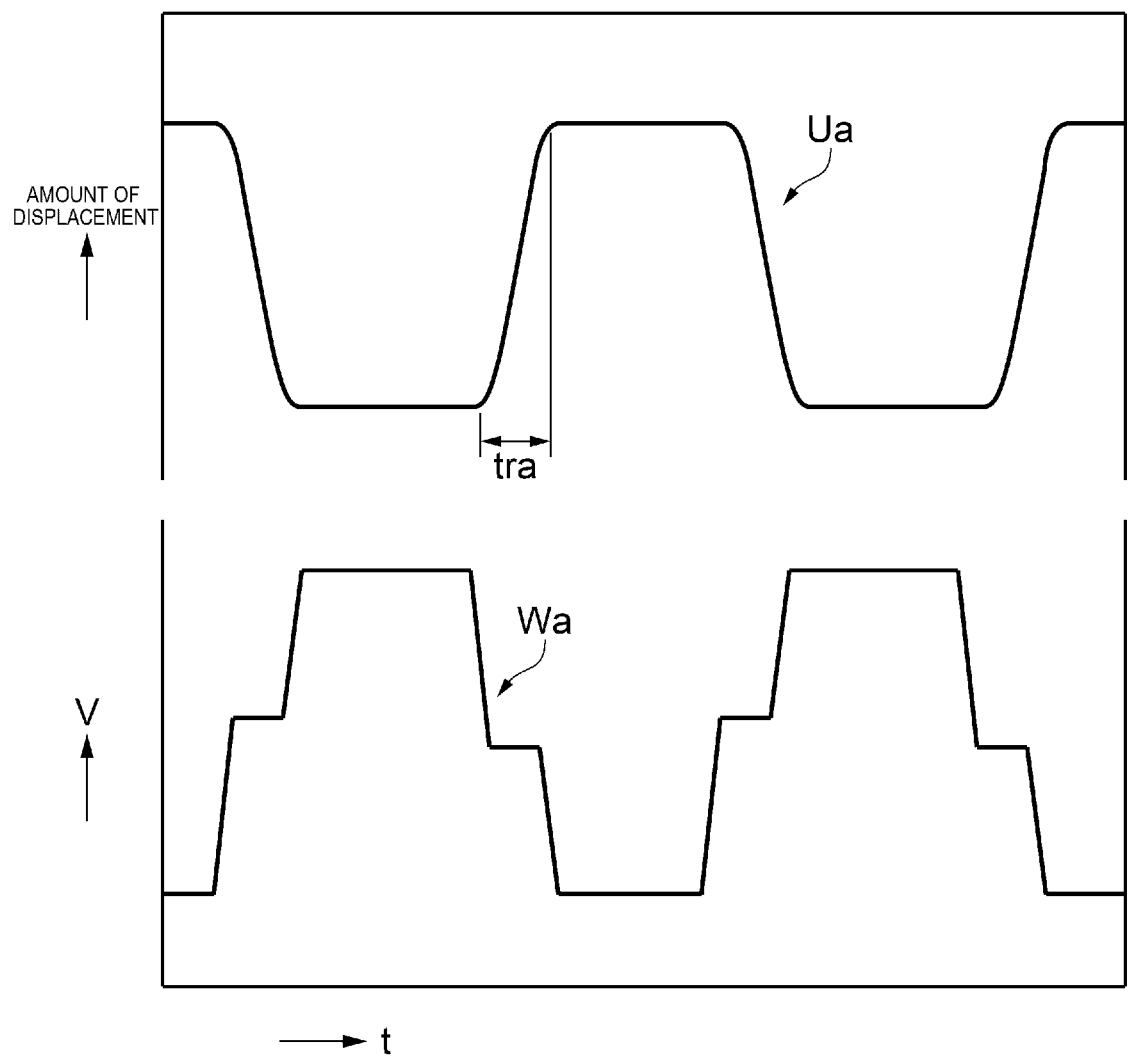
FIG. 9 shows the drive signal and the resultant trajectory of the optical path shifting device.

FIG. 9 shows the drive signal according to the present embodiment and the resultant trajectory of the optical path shifting device, and FIG. 9 corresponds to FIG. 12. The following description will be made about an actual trajectory achieved when the optical path shifting device 2 is driven based on the drive signal according to the present embodiment with reference to FIGS. 8 and 12.

A trajectory Ua in FIG. 9 represents trajectory data on the amplitude of the measurement point P (FIG. 6) on the movable section 3 measured along the temporal axis with a laser displacement gauge when the waveform Wa is supplied as the drive signal to the optical path shifting device 2 to cause the movable section 3 to swing, as in the description with reference to FIG. 12.

The waveform Wa of the drive signal shown in FIG. 9 has a frequency of 60 Hz and an amplitude of 3.3 V. The waveform Wo in the related art has the same frequency and amplitude, as described above. The voltage change width Va in the leg section Lc is set at 1.8 V, and the voltage change width Vb in the leg section Ld is set at 1.5 V.

When the drive signal is applied, the inclination of the movable section 3 is about ±0.13 degrees, which is converted into the amplitude of the measurement point P (FIG. 6) in swinging, which is about ±60 μm. The thus set values vary in accordance with the size, the resolution, and the pixel interval of the liquid crystal display elements, the configuration of the optical path shifting device 2, and other factors and are therefore presented as an example of the set values in the present example.

In the trajectory Ua shown in FIG. 9, the rising period tra from the lower base to the upper base is 1.35 ms. The drive operation using the waveform Wa therefore allows the flat section of the upper base to be reached in a period shorter than the rising period tro of 2.12 ms provided by the related-art trajectory Uo shown in FIG. 12. The falling period is also shortened.

Since the waveform Wa and the related-art waveform Wo have the same frequency and amplitude, as described above, shorter rising and falling periods in the leg sections result in longer periods in the linear portions of the upper and lower bases. That is, driving the optical path shifting device 2 by using the waveform Wa in the present embodiment as the drive signal allows a substantially ideal trajectory having the linear portions of the upper and lower bases maintained for a long period.

Further, the trajectory Ua shown in FIG. 9 is substantially flat after each falling edge and has no overshoot or undershoot, as compared with the trajectory Uo shown in FIG. 12. The trajectory Ua is substantially flat and has no overshoot or undershoot also after the following rising edge. That is, a trajectory substantially equal to the ideal trajectory is provided.

A conceivable reason of the above is as follows: The simple trapezoidal-wave drive signal in the related art causes overshoots due to the voltage application in the leg section La formed of a single straight line, whereas the configuration in which the inclination of the leg section Ld following the plateau-shaped flat section F3 is smaller than the inclination of the front leg section Lc contributes to suppression of abrupt change in voltage. In detail, it is considered that the waveform Wa having the rear, less inclining leg section Ld can adjust the excessive energy that causes overshoots in the leg section La in the related art to appropriate energy.

As described above, the optical path shifting device and the method for controlling the optical path shifting device according to the present embodiment can provide the following effects.

The control circuit 120 uses the drive circuit 122 to control the operation of driving optical path shifting device 2. In detail, the drive circuit 122 generates the waveform Wa as the drive signal shown in FIG. 9 and drives the optical path shifting device 2 by using the waveform Wa. The waveform Wa has leg sections each provided with the plateau-shaped flat section F3. The movable section 3 can therefore be moved in a shorter period than in the related-art drive/control method using the leg sections each formed of a single straight line, whereby the movable section 3 can be driven and controlled along a substantially ideal trajectory.

A drive signal that achieves a more ideal trajectory than the trajectory provided by the control method using the related-art drive signal and a drive/control method that excels the related-art control method can therefore be provided.

The projector 1 includes the control circuit 120, the drive circuit 122, and the optical path shifting device described above. A projector capable of producing a high-definition projected image that excels in image quality can therefore be provided.

Embodiment 2

1) Description of Drive Signal Waveform

Figure 10:
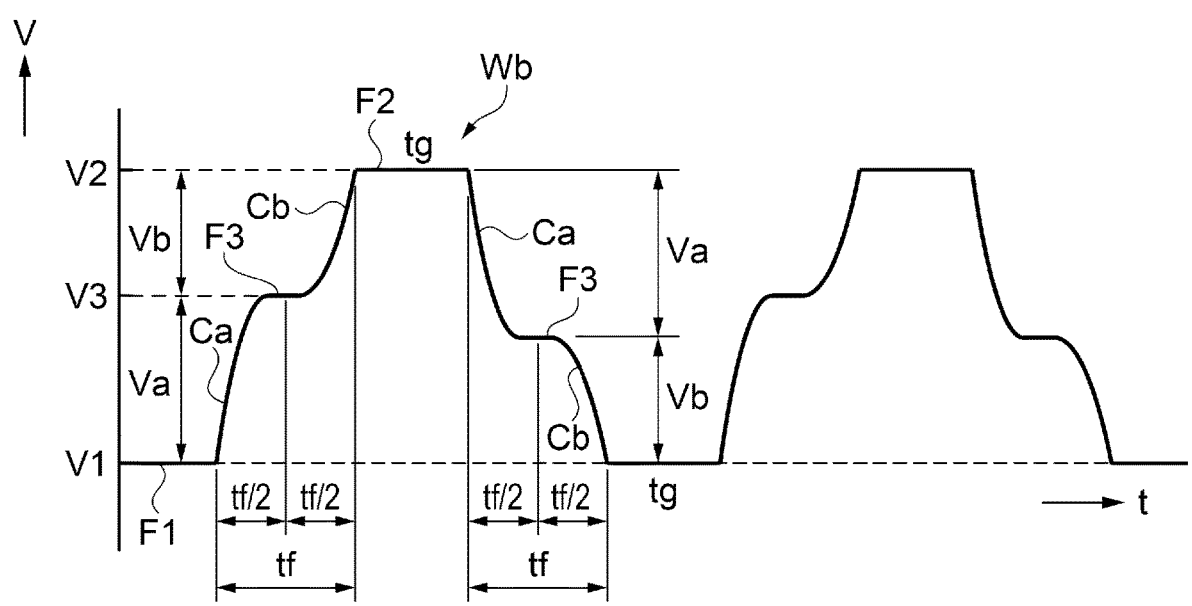
FIG. 10 is a waveform diagram of a drive signal according to Embodiment 2.

FIG. 10 is a waveform diagram of the drive signal according to the present embodiment, and FIG. 10 corresponds to FIG. 8. A characteristic drive signal waveform in the present embodiment will be described in comparison with the waveform Wa in FIG. 8. The same constituent portions as those in Embodiment 1 have the same reference numbers and will not be redundantly described. The waveform Wb in FIG. 10 is the waveform of the drive signal in the present embodiment. The waveform Wb is the same as the waveform Wa in Embodiment 1 in terms of the flat section F3 provided in the middle of each leg section but differs from the waveform Wa in Embodiment 1 in terms of a curve provided in each leg section. The points other than the leg sections are the same as those in Embodiment 1.

The rising waveform will first be described.

The rising leg section is formed of a leg section Ca as the first leg section, the flat section F3, and a leg section Cb as the second leg section.

The leg section Ca is a first-quarter-cycle curve of a sinusoidal wave, and the curve rises from the low-potential flat section F1 and connects to the flat section F3. The flat section F3 corresponds to the third flat section and is a linear portion along the potential of the voltage V3. The leg section Cb is a quarter-cycle curve of a reversed-phase sinusoidal wave, and the curve rises from the flat section F3 and connects to the flat section F2. The curve of the leg section Cb is the second-quarter-cycle curve of the reversed sinusoidal wave of the leg section Ca.

In a preferable example, the waveform Wb in the present embodiment and the waveform Wo in the related art also have the same cycle and amplitude.

The first period for which the low-potential voltage V1 is applied and the second period for which the high-potential voltage V2 is applied are each a same-length period tg.

A rising period tf required for the waveform Wb to rise from the voltage V1 to the voltage V2 is substantially halved into periods for the leg section Ca and the leg section Cb. The reason why the phrase "substantially halved" is used is that the third period for which the voltage in the flat section F3 is applied is ensured although it is a very short period. The flat section F3 having a very small flat portion can still be considered as a substantial flat section because the gently-sloping curve in the vicinity of the maximum amplitude of the sinusoidal wave is connected to the flat section F3.

The voltage change width Vb in the leg section Cb is set to be smaller than the voltage change width Va in the leg section Ca.

The falling waveform will next be described.

The falling waveform is the upside-down rising waveform. Reversing the waveform diagram upside down and replacing the voltage V2 with the voltage V1 and the voltage V1 with the voltage V2 allow the description of the falling waveform to be the same as the description of the rising waveform described above, and the flat section F3 is provided in the middle of each leg section.

After the falling waveform reaches the voltage V1, the voltage V1 is maintained for the period tg in the flat section F1. One cycle of the waveform Wb is thus achieved.

2) Example

Figure 11:
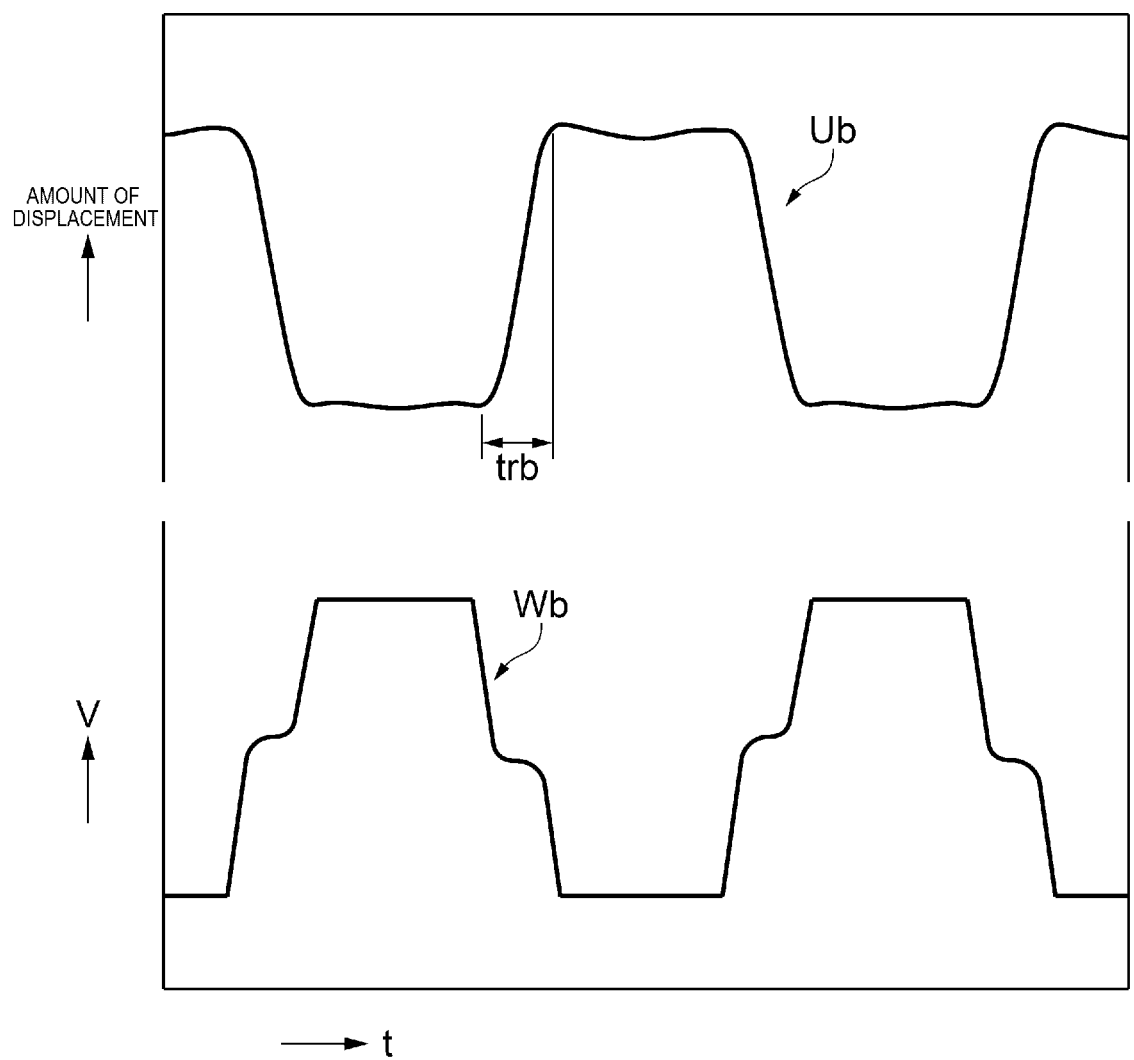
FIG. 11 shows the drive signal according to Embodiment 2 and the resultant trajectory of the optical path shifting device.

FIG. 11 shows the drive signal according to the present embodiment and the resultant trajectory of the optical path shifting device, and FIG. 11 corresponds to FIGS. 9 and 12. The following description will be made about an actual trajectory achieved when the optical path shifting device 2 is driven based on the drive signal according to the present embodiment with reference to FIGS. 9 and 12.

A trajectory Ub in FIG. 11 represents trajectory data on the amplitude of the measurement point P (FIG. 6) on the movable section 3 measured along the temporal axis with a laser displacement gauge when the waveform Wb is supplied as the drive signal to the optical path shifting device 2 to cause the movable section 3 to swing, as in the description with reference to FIG. 12.

The waveform Wb of the drive signal shown in FIG. 11 has the frequency of 60 Hz and the amplitude of 3.3 V. The waveform Wo in the related art has the same frequency and amplitude. The voltage change width Va in the leg section Lc is set at 1.8 V, and the voltage change width Vb in the leg section Ld is set at 1.5 V.

In the trajectory Ub, the rising period trb from the lower base to the upper base is 1.39 ms. The rising period trb is substantially equal to the rising period tra of 1.35 ms provided by the trajectory Ua in Embodiment 1. The drive operation using the waveform Wb therefore also allows the flat section of the upper base to be reached in a period shorter than the rising period tro of 2.12 ms provided by the related-art trajectory Uo, as does the waveform Wa.

Further, the trajectory Ub shown in FIG. 11 is substantially flat after each falling edge and has no overshoot or undershoot, as compared with the trajectory Uo shown in FIG. 12. The trajectory Ub is substantially flat and has no overshoot or undershoot also after the following rising edge. That is, a trajectory substantially equal to the ideal trajectory is provided.

As described above, the drive method using the waveform Wb according to the present embodiment as the drive signal can also provide the same operational effects as those provided by the waveform Wa according to Embodiment 1.

The present disclosure is not limited to the embodiments describe above, and a variety of changes, improvements, and other modifications can be made to the embodiments described above. Variations will be described below.

Variation 1

Variation 1 will be described with reference to FIG. 8.

Embodiment 1 has been described with reference to the preferable example in which the rising period td required for the leg section to rise is divided equally into three periods for the leg section Lc, the flat section F3, and the leg section Ld, but not necessarily. A result of an experiment conducted by the present inventors shows that the longer the period for which the flat section F3 lasts, that is, the greater θ1 and θ2, the shorter the rising period. The application period in the flat section F3 is therefore preferably longer than or equal to td/3. There is, however, a tradeoff between the application period and, for example, noise resulting from the abrupt change, and the application period may be so set that a desired rising period is achieved. The optical path shifting device 2 can thus be driven by using a more ideal trajectory. Further, the set values vary in accordance with the size, the resolution, and the pixel interval of the liquid crystal display elements, the configuration of the optical path shifting device 2, and other factors and therefore need to be optimized in accordance with the specifications described above.

Variation 2

In Embodiment 1 described above, as a preferable example, the voltage change width Vb in the leg section Ld is set to be smaller than the voltage change width Va in the leg section Lc, but not necessarily. The voltage change widths only need to be optimized in accordance, for example, with the characteristics of the optical path shifting device 2.

Variation 3

The aforementioned embodiments have been described with reference to the case where the optical path changing plate 30 of the optical path shifting device 2 is made of glass having light transparency, but the material is not limited to glass, and a mirror having light reflectivity may instead be used. In this case, the optical device according to any of the embodiments can be used also as an optical device for optical scanning, an optical switch, an optical attenuator, and other devices.

Variation 4

The aforementioned embodiments have been described with reference to the configuration in which the spatial light modulator is formed of transmissive liquid crystal display elements, however, the spatial light modulator may instead be formed of reflective liquid crystal display elements, such as a liquid-crystal-on-silicon (LCOS) device (LCoS is registered trademark), or a digital micromirror device (DMD). Further, the image display apparatus is not limited to a projector and may instead be a head mounted display (HMD) or a head-up display (HUD).

Contents derived from the embodiments will be described below.

A method for controlling an optical device according to the present application is a method for controlling an optical device including a movable section including an optical section that refracts incident video image light in accordance with the angle of incidence of the video image light and outputs the refracted video image light and a holding section that supports the optical section, and an actuator that causes the movable section to swing, the method including applying a drive signal to the actuator to cause the movable section to swing. The drive signal is a wave having a trapezoidal waveform, and the trapezoidal wave has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied.

According to the control method, the trapezoidal wave that forms the drive signal has leg sections each provided with the third flat section, which has a plateau-like shape. The movable section can therefore be moved in a shorter period than in the related-art drive/control method using the leg sections each formed of a single straight line, whereby the movable section can be driven and controlled along a substantially ideal trajectory.

A drive signal that achieves a more ideal trajectory than the trajectory provided by the control method using the related-art drive signal and a drive/control method that excels the related-art control method can therefore be provided.

In the method for controlling an optical device described above, the third voltage may be higher than an intermediate value between the first voltage and the second voltage.

In the method for controlling an optical device described above, each leg section of the trapezoidal wave may have a first leg section that connects the first flat section to the third flat section, the third flat section, and a second leg section that connects the third flat section to the second flat section, and the first and second leg sections may each be a straight line.

The inclination of the second leg section with respect to the first flat section may be smaller than the inclination of the first leg section with respect to the first flat section.

According to the control method, the trapezoidal wave that forms the drive signal is further optimized, whereby the movable section can be driven and controlled along a more ideal trajectory.

In the method for controlling an optical device described above, the leg section of the trapezoidal wave may have a first leg section that connects the first flat section to the third flat section, the third flat section formed of a straight line, and a second leg section that connects the third flat section to the second flat section, and the first and second leg sections may each include a curve.

According to the control method, the trapezoidal wave that forms the drive signal has leg sections each provided with the third flat section, which has a plateau-like shape. The movable section can therefore be moved in a shorter period than in the related-art drive/control method using the leg sections each formed of a single straight line, whereby the movable section can be driven and controlled along a substantially ideal trajectory.

A drive signal that achieves a more ideal trajectory than the trajectory provided by the control method using the related-art drive signal and a drive/control method that excels the related-art control method can therefore be provided.

In the method for controlling an optical device described above, the first and second leg sections may each be a quarter-cycle sinusoidal wave.

According to the control method, the trapezoidal wave that forms the drive signal is further optimized, whereby the movable section can be driven and controlled along a more ideal trajectory.

An optical device according to the present application includes a movable section including an optical section that refracts incident video image light in accordance with the angle of incidence of the video image light and outputs the refracted video image light and a holding section that supports the optical section, an actuator that causes the movable section to swing, and a drive circuit that applies a drive signal to the actuator. The drive signal is a wave having a trapezoidal waveform, and the trapezoidal wave has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied.

According to the optical device, the drive circuit applies the trapezoidal wave having leg sections each provided with a plateau-shaped flat section as the drive signal to cause the movable section to swing. The movable section can therefore be moved in a shorter period than in the related-art optical device using the leg sections each formed of a single straight line, whereby the movable section can be driven and controlled along a substantially ideal trajectory.

An optical device that realizes move ideal trajectory than that in the related-art optical device can therefore be provided.

An image display apparatus according to the present application includes the optical device described above and a projection optical system that enlarges and projects the video image light outputted from the optical device.

According to the configuration described above, the image display apparatus includes the optical device that achieves a substantially ideal trajectory and the projection optical system that enlarges and projects the video image light outputted from the optical device and having higher resolution. An image display apparatus capable of producing a high-definition projection image that excels in image quality, instead of the related-art image display apparatus having poor image quality, can therefore be provided.

What is claimed is:

1. A method for controlling an optical device including a movable section including an optical section that refracts incident video image light in accordance with an angle of incidence of the video image light and outputs the refracted video image light and a holding section that supports the optical section, and an actuator that causes the movable section to swing, the method comprising
    applying a drive signal to the actuator to cause the movable section to swing,
    wherein the drive signal is a wave having a trapezoidal waveform, and
    the trapezoidal waveform has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied, wherein the third flat section is between and parallel to the first flat section and the second flat section.

2. The method for controlling an optical device according to claim 1, wherein the third voltage is higher than an intermediate value between the first voltage and the second voltage.

3. The method for controlling an optical device according to claim 1,
    wherein a rising leg section and a falling leg section of the trapezoidal waveform each has
    a first leg section that connects the first flat section to the third flat section,
    the third flat section, and
    a second leg section that connects the third flat section to the second flat section, and
    the first and second leg sections are each a straight line, and
    the third flat section is oblique to the first leg section and the second leg section.

4. The method for controlling an optical device according to claim 3, wherein inclination of the second leg section with respect to the first flat section is smaller than inclination of the first leg section with respect to the first flat section.

5. The method for controlling an optical device according to claim 1,
    wherein a rising leg section and a falling leg section of the trapezoidal waveform each has
    a first leg section that connects the first flat section to the third flat section,
    the third flat section formed of a straight line, and
    a second leg section that connects the third flat section to the second flat section, and
    the first and second leg sections each include a curve, and
    the third flat section is oblique to the first leg section and the second leg section.

6. The method for controlling an optical device according to claim 5, wherein the first and second leg sections are each a quarter-cycle sinusoidal wave.

7. An optical device comprising:
    a movable section including an optical section that refracts incident video image light in accordance with an angle of incidence of the video image light and outputs the refracted video image light and a holding section that supports the optical section;
    an actuator that causes the movable section to swing; and
    a drive circuit that applies a drive signal to the actuator, wherein the drive signal is a wave having a trapezoidal waveform, and the trapezoidal waveform has a first flat section where first voltage is applied for a first period, a second flat section where second voltage higher than the first voltage is applied for a second period, and a third flat section where third voltage higher than the first voltage and lower than the second voltage is applied for a third period after the first voltage is applied and before the second voltage is applied, wherein the third flat section is between and parallel to the first flat section and the second flat section.

8. An image display apparatus comprising:

the optical device according to claim 7; and a projection optical system that enlarges and projects the video image light outputted from the optical device.

* * * * *